(12) United States Patent
Sharma et al.

(10) Patent No.: US 7,302,306 B1
(45) Date of Patent: Nov. 27, 2007

(54) DETERMINING PROCESSING TIMES AT STATIONS IN AN ASSEMBLY SYSTEM

(75) Inventors: Parit K. Sharma, Cambridge (CA); Michael A Denomme, London (CA)

(73) Assignee: Electronic Data Systems Corporation, Plano, TX (US)

( * ) Notice: Subject to any disclaimer, the term of this patent is extended or adjusted under 35 U.S.C. 154(b) by 37 days.

(21) Appl. No.: 11/434,040

(22) Filed: May 15, 2006

(51) Int. Cl.
*G06F 19/00* (2006.01)
(52) U.S. Cl. .................. 700/115; 700/114; 700/229
(58) Field of Classification Search ........ 700/112–116, 700/229; 29/783–786
See application file for complete search history.

(56) References Cited

U.S. PATENT DOCUMENTS

| | | | | |
|---|---|---|---|---|
| 5,699,242 | A | * | 12/1997 | Togawa et al. ............... 700/5 |
| 5,844,802 | A | * | 12/1998 | Lepper et al. ............. 700/115 |
| 6,141,598 | A | * | 10/2000 | Nam ........................... 700/95 |
| 6,772,027 | B2 | * | 8/2004 | Kurihara .................... 700/99 |
| 6,856,844 | B1 | * | 2/2005 | McKenzie .................. 700/96 |
| 7,228,192 | B2 | * | 6/2007 | Popplewell ............... 700/115 |
| 2002/0198618 | A1 | * | 12/2002 | Madden et al. ........... 700/101 |

OTHER PUBLICATIONS

Lahmar et al—"Resequencing and Feature Assignment on an Automated Assembly Line"—IEEE Transactions on Robotics and Automation, vol. 19, No. 1, Feb. 2003.*
GE Fanuc Automation, "Cimplicity® Tracker," GFA-341, Aug. 2001, 2 pages.

* cited by examiner

*Primary Examiner*—Alexander Kosowski
(74) *Attorney, Agent, or Firm*—Fish & Richardson P.C.

(57) ABSTRACT

An assembly system may assemble articles of manufacture at a plurality of assembly regions and may log a time at which each article of manufacture enters or exits an assembly region. Assembly regions may include sequential assembly stations that process the articles. A method of determining when a specific article was processed by a specific assembly station may include receiving input identifying a specific article; receiving additional input identifying one of the plurality of sequential assembly stations; determining an offset of the identified sequential assembly station relative to a first assembly station or to a last assembly station within a region that comprises the identified sequential assembly station; and determining a time at which a second sequentially processed article entered or exited the region. The identified specific article and the second sequentially processed article may have been separated by a number of articles corresponding to the offset.

20 Claims, 8 Drawing Sheets

| Vehicle | Time Vehicle Entered Region | Time Vehicle Exited Region |
|---|---|---|
| CABF | 8:08:23 | 8:51:26 |
| CABE | 8:10:36 | 8:57:53 |
| CABD | 8:12:49 | 9:00:06 |
| CABC | 8:49:11 | 9:02:19 |
| ⋮ | ⋮ | |
| ABCK | 14:37:00 | |
| ABCJ | 14:39:13 | ⋮ |
| ABCI | 14:41:26 | |
| ABCH | 14:46:44 | |

FIG. 4A

| Vehicle | Entered Region/ Station 0055 | Entered 0056 | Entered 0057 | Entered 0058 | Exited Region |
|---|---|---|---|---|---|
| CABF | 14:38:56 | 14:42:48 | 15:04:48 | 15:08:41 | 15:25:05 |
| CABE | 14:42:48 | 15:04:48 | 15:08:41 | 15:25:05 | 15:28:57 |
| CABD | 15:04:48 | 15:08:41 | 15:25:05 | 15:28:57 | 15:32:50 |
| CABC | 15:08:41 | 15:25:05 | 15:28:57 | 15:32:50 | 15:38:01 |
| | | | | | |

. . .

| Vehicle | Entered Region 0027 | Entered 0028 | Entered 0029 | Entered 0030 | Exited Region |
|---|---|---|---|---|---|
| CABF | 8:08:23 | 8:10:36 | 8:12:49 | 8:49:11 | 8:51:26 |
| CABE | 8:10:36 | 8:12:49 | 8:49:11 | 8:51:26 | 8:57:53 |
| CABD | 8:12:49 | 8:49:11 | 8:51:26 | 8:57:53 | 9:00:06 |
| CABC | 8:49:11 | 8:51:26 | 8:57:53 | 9:00:06 | 9:02:19 |
| | | | | | |

| | | | | | |
|---|---|---|---|---|---|
| ABCK | 14:37:00 | 14:39:13 | 14:41:26 | 14:46:44 | 14:51:10 |
| ABCJ | 14:39:13 | 14:41:26 | 14:46:44 | 14:51:10 | 14:53:23 |
| ABCI | 14:41:26 | 14:46:44 | 14:51:10 | 14:53:23 | 14:55:36 |
| ABCH | 14:46:44 | 14:51:10 | 14:53:23 | 14:55:36 | 14:57:49 |

FIG. 4B

| Start | End | Personnel | Station |
|---|---|---|---|
| | ⋮ | | |
| 7:55:02 | 9:37:14 | IV | 0030 |
| 7:59:46 | 9:36:22 | I | 0028 |
| 8:01:38 | 10:05:18 | III | 0029 |
| 9:35:00 | 11:18:37 | V | 0030 |
| 9:35:21 | 11:16:19 | II | 0028 |
| | ⋮ | | |

FIG. 4C

| Console | Automobile | Status |
|---|---|---|
| | ⋮ | |
| 3456 | ABCJ | OK |
| 1234 | ABCI | OK |
| 5678 | ABCH | OK |
| 9012 | ABCG | OK |
| | ⋮ | |

DETERMINING PROCESSING TIMES AT STATIONS IN AN ASSEMBLY SYSTEM

TECHNICAL FIELD

This description generally relates to processing data, and more particularly to determining processing times at stations in an assembly system.

BACKGROUND

A large assembly system may be used to progressively assemble products or other articles of manufacture. The assembly system may include tens or hundreds of assembly stations at which various components or subassemblies are combined to create the products. Machines or human personnel at each assembly station may be responsible for a small portion of the completed product. For example, assembly personnel at one assembly station may add a single component to in-process products; an automated machine or assembly robot may add another component to in-process products at another assembly station. More concretely, an automobile may be assembled from thousands of components at hundreds of different assembly stations. In particular, assembly personnel at some assembly stations may add small parts, such as screws, bolts or wiring harnesses to the interior of an in-process automobile; assembly robots at other assembly stations may add large components or subassemblies, such as engines, transmissions, quarter-panels or windshields.

An assembly system may include various computer controls, systems and software to control aspects of the assembly process. For example, in an automobile assembly system, a central computer system may control various robots that install windshields at a particular assembly station. The central computer system may also store certain data related to the assembly process. For example, the computer system may temporarily store data related to a specific automobile during the assembly of that specific automobile; the computer system may archive other data related to all automobiles, such as certain safety-related data. The CIMPLICITY Tracker™ System by GE FANUC of Charlottesville, Va., is one example software package that an automobile manufacturer may employ to control portions of an automobile assembly system and to archive various data associated with the automobile assembly system.

SUMMARY

An assembly system may have a plurality of assembly stations that process one or more articles of manufacture. The assembly stations may be arranged in regions, and certain information may be captured in a database for each article relative to the various assembly regions. To minimize the size of the database, detailed information for each article may be captured at the region level rather than at the assembly station level. Nevertheless, information for individual articles relative to individual assembly stations may be determined using the system and techniques described herein.

In some implementations, an assembly system may assemble articles of manufacture at a plurality of assembly regions and may log a time at which each article of manufacture enters or exits an assembly region. Each assembly region may include a plurality of sequential assembly stations, and each assembly station may be configured to process an article of manufacture. A method of determining when a specific article of manufacture was processed by a specific assembly station may include receiving input in the assembly system identifying a specific article of manufacture; receiving additional input identifying one of the plurality of sequential assembly stations; determining an offset of the identified sequential assembly station relative to a first assembly station or to a last assembly station within a region that comprises the identified sequential assembly station; and determining a time at which a second sequentially processed article of manufacture entered or exited the region. The identified specific article of manufacture and the second sequentially processed article of manufacture may have been separated in the assembly system by a number of articles of manufacture corresponding to the offset.

In some implementations, the number of articles of manufacture that corresponds to the offset may be equal to the offset adjusted by a fixed number. Processing the article of manufacture may include adding a component to the article of manufacture. Logging the time at which each article of manufacture enters or exits an assembly region may include logging the time in a database. Logging the time may include logging the time at which each article of manufacture enters an assembly region. The database may be included in a automobile assembly tracking system. Determining the time at which the second sequentially processed article of manufacture entered or exited the region may include retrieving a logged time entry from the database. Retrieving the logged time entry may include executing a structured query language (SQL) statement to retrieve the logged entry.

In some implementations, the method may further include determining a second time at which a third sequentially processed article of manufacture entered or exited the region; the third sequentially processed article of manufacture may have been processed adjacent to the second sequentially processed article of manufacture. The method may further include determining a time at which the identified specific article of manufacture was processed by the identified assembly station based on a difference between the determined time and the determined second time. The method may further include correlating another assembly parameter with the identified specific article of manufacture and the identified sequential assembly station. Correlating another assembly parameter with the identified specific article of manufacture may include correlating one or more specific assembly personnel with the identified specific article of manufacture and the identified sequential assembly station based on the determined time. Correlating one or more specific assembly personnel may include identifying one or more specific assembly personnel assigned to the identified sequential assembly station at the determined time.

In some implementations, determining the time at which the second sequentially processed article of manufacture entered or exited the region may include determining whether another article of manufacture has been physically removed midstream from the assembly system. The method may further include adjusting the offset when another article of manufacture has been physically removed midstream from the assembly system.

The general and specific aspects may be implemented using a system, a process, or a computer program, or any combination of systems, processes, and computer programs. The details of one or more implementations are set forth in the accompanying drawings and the description below.

BRIEF DESCRIPTION OF DRAWINGS

Like reference symbols in the various drawings indicate like elements.

DETAILED DESCRIPTION

Figure 1:
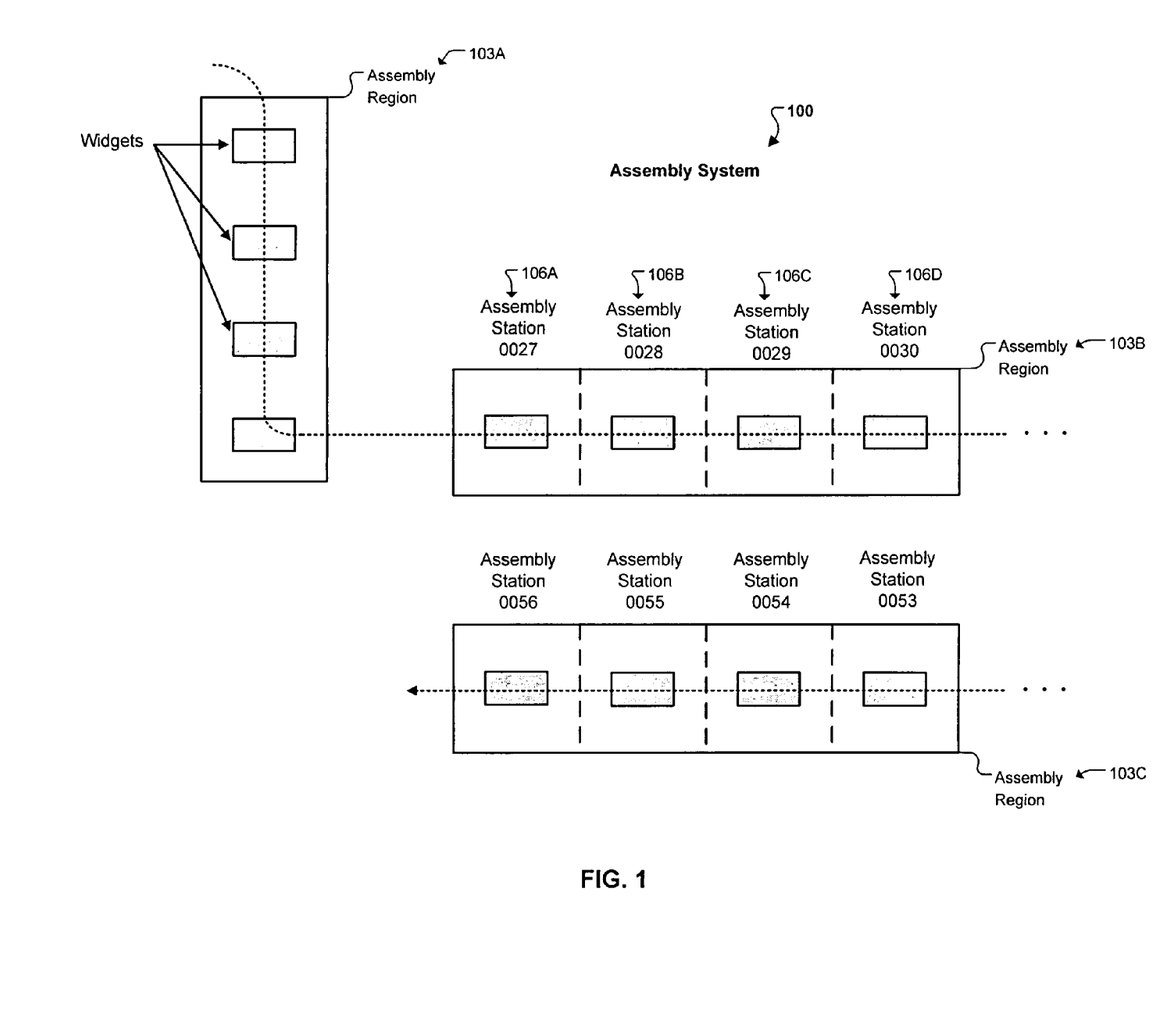
FIG. 1 is a conceptual block diagram of an example assembly system.

FIG. 1 is a conceptual block diagram of an assembly system having a plurality of assembly stations that process widgets. For purposes of this description, the term "widget" is used to indicate that the described systems and techniques are not limited to a particular product, article of manufacture or type of assembly process. The assembly stations are arranged in regions, or groups of assembly stations. For example, one region may include five assembly stations that each perform similar operations on the widgets; another region may include twenty different assembly stations that perform another series of similar operations on the widgets. Certain information may be captured in a database for each widget relative to the various assembly regions. In other words, to minimize the size of the database, detailed information for each widget relative to each assembly station may not be captured. Nevertheless, the information for individual widgets relative to individual assembly stations may be determined using the system and techniques described herein.

The assembly system 100 includes a number of assembly regions 103A, 103B and 103C. Each assembly region may include a plurality of sequential assembly stations (e.g., assembly stations 0027-0030 and 0053-0056). Widgets move from region to region and from assembly station to assembly station within each region as they are assembled, and each assembly station may process widgets in some manner. Processing widgets may include, for example, adding a component to the widget at an assembly station, removing a temporary component (e.g., production waste) from the widget at the assembly station, inspecting the widget at the assembly station, or performing some other type of handling or processing operation at the assembly station. The processing at each assembly station may be performed by automated machines, such as assembly robots, or by human personnel.

Some regions may be used to temporarily store or buffer widgets before or after a region having one or more assembly stations. For example, the region 103A buffers widgets for region 103B. If a preceding region processes widgets faster than region 103B, extra widgets can be stored, or buffered, by the region 103A. Similarly, if the region 103B begins processing widgets faster than preceding regions, the region 103B may draw widgets from the buffer region 103A until the widgets in the buffer region are exhausted.

Within regions having sequential assembly stations, the widgets proceed from one assembly station to the next in sequence, and the widgets in the assembly region generally "pitch" or move together. For example, a widget moves into assembly station 0027 from region 103A at generally the same time that the widget currently in assembly station 0027 moves to assembly station 0028.

In some implementations, times at which a widget enters or exits a region may be logged in a database. Details of an example database system for logging information associated with the assembly system are described with reference to FIG. 3 below. To reduce the size of the database, times at which specific widgets enter or exit a specific assembly station may not be logged. Nevertheless, it may be advantageous to later determine a precise time at which a specific widget was processed by a specific assembly station. For example, such a determination may be advantageous for purposes of training personnel assigned to specific assembly stations or for issues related to widget recalls.

Figure 2:
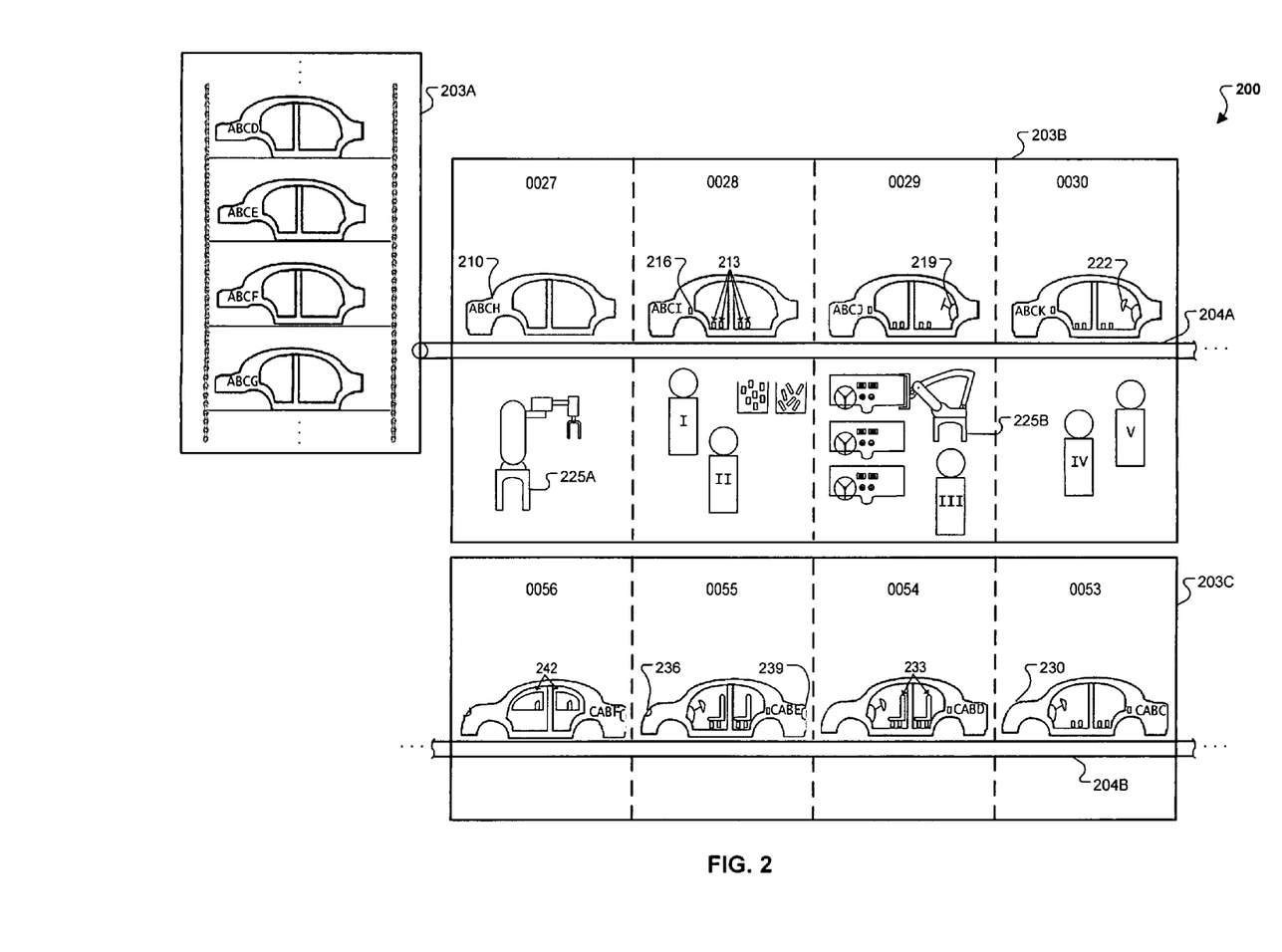
FIG. 2 illustrates a specific example application of the assembly system that is shown in FIG. 1.

FIG. 2 illustrates a specific example application of the assembly system 100 that is shown in FIG. 1. In particular, FIG. 2 illustrates portions of an automobile assembly system 200. The automobile assembly system 200 includes various assembly regions 203A, 203B and 203C, and various assembly stations. For example, region 203A is a buffer region that supplies region 203B with partially assembled automobiles; region 203B includes four assembly stations, labeled 0027, 0028, 0029 and 0030.

At each of the four assembly stations 0027-0030, additional components are added to the partially assembled automobiles. In particular, a rear quarter panel 210 is added at station 0027; mounting bolts 213 for seats and a door frame sticker 216 (e.g., a sticker related to a child lock safety feature) are added in station 0028; a console 219 is added in station 0029; and a driver-side airbag 222 may be added in station 0030. The various components may be added by either automated machines (e.g., robots), human personnel, or some combination of the two. For example, a robot 225A may install a quarter panel 210 at assembly station 0027; assembly employees I and II may install the seat mounting bolts 213 and door frame sticker 216 at assembly station 0028; both a robot 225B and an assembly employee III may be involved in installing the console 219 at assembly station 0029; and assembly employees IV and V may install a driver-side airbag 222 at assembly station 0030.

Region 203C includes four additional assembly stations, labeled 0053, 0054, 0055 and 0056, at which additional components may be added to partially assembled automobiles. For example, a front quarter panel 230 is added at assembly station 0053; seats 233 are added assembly station 0054; headlights 236 and taillights 239 are added at assembly station 0055; and doors 242 are added at assembly station 0056. Each of these components may be added by automated machines (e.g., robots), human personnel, or some combination of automated machines and human personnel.

Within the assembly system 200, processing at any given assembly station generally affects future processing actions at other assembly stations or is necessary to meet a safety or regulatory requirement. For example, installation of the mounting bolts 213 for the seats 233 in assembly station 0028 affects whether seats 233 can be properly installed in assembly station 0054. Installation of the door sticker 216 may be necessary for the finished automobile to be compliant with a regulatory requirement. Installation of the airbag 222 in assembly station 0030 may affect the overall safety of the finished automobile.

Because of the interrelated nature of each assembly station, the possibility to determine with some precision the time at which a specific automobile is processed by a specific assembly station may be advantageous. For example, if it is determined at assembly station 0054 that the seats 233 cannot be installed in vehicle CABD because of incorrectly installed mounting bolts 213, it may be advantageous to determine when vehicle CABD was processed at assembly station 0028 to identify personnel that may require additional training, or to identify a lot of components that may have been defective and may have impacted other automobiles. Similarly, if it is later discovered that a particular lot of driver-side airbags 222 are defective, it may be necessary to determine when specific automobiles were processed by assembly station 0030 at which the airbags were installed to determine which automobiles received the defective airbags.

As mentioned above, times at which specific automobiles are processed at specific assembly stations in an assembly system may not be logged. In some implementations, such as in an automobile assembly system, these times may not be logged in order to conserve space in a database. In an automobile assembly system, individual automobiles may be processed at hundreds of stations as they are assembled. Moreover, regulations may require automobile manufacturers to store certain data about each automobile that is manufactured. For example, an automobile manufacturer may be required to store safety related data (e.g., data about airbag type and model, seatbelt model information, information about antilock brake systems, etc.) for individual automobiles for a period of seven or more years after the automobile is manufactured. In light of this complexity in the assembly process and in light of possible data retention requirements, it may not be feasible to store processing time stamps for each widget at each assembly station in an assembly system. Nevertheless, there are circumstances in which this information is useful. Accordingly, a process of determining precise processing times for each automobile in an automobile assembly system, or more generally, for each widget at each assembly station in an assembly system may be advantageous.

Figure 3:
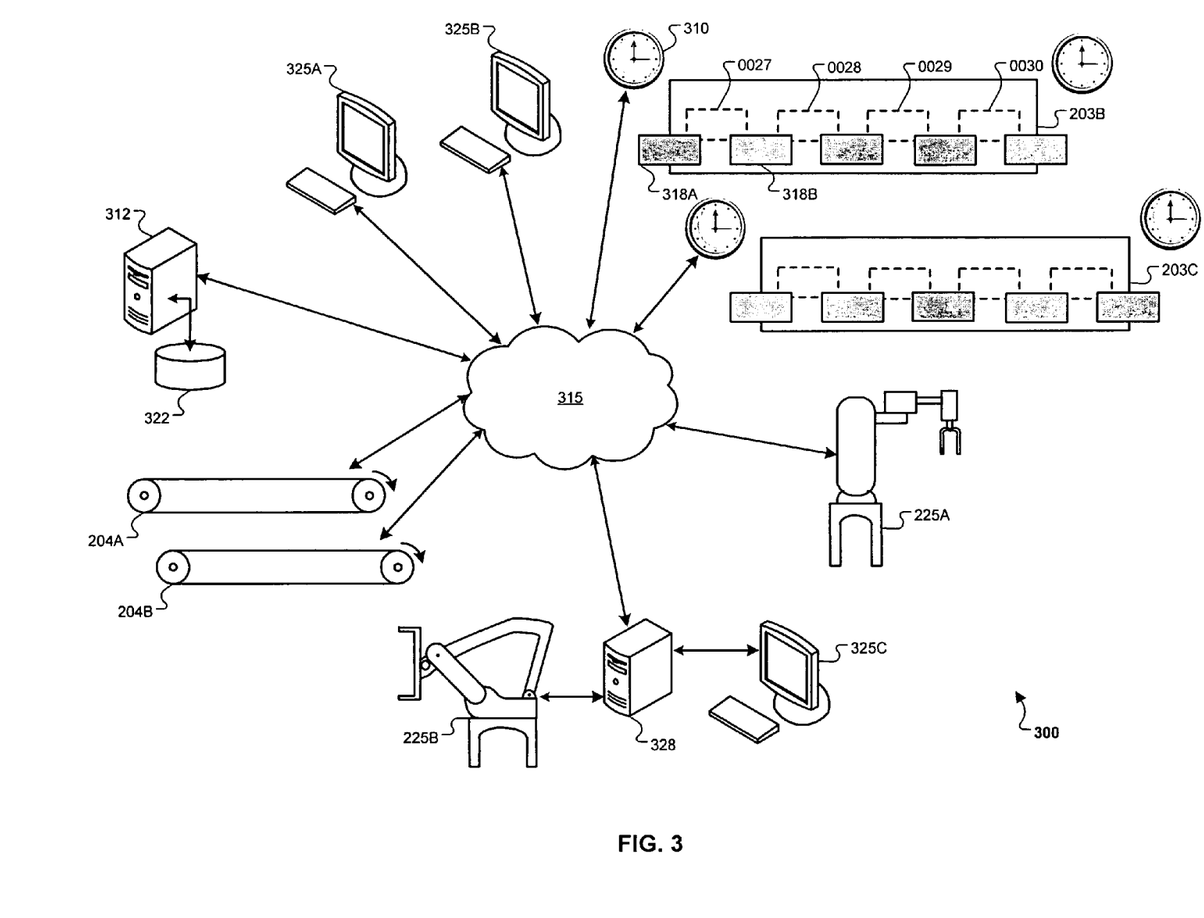
FIG. 3 is an example control and data acquisition subsystem that may be included in an assembly system.

FIG. 3 illustrates an example control and data acquisition subsystem 300 that may be included in an assembly system, such as the assembly system 200 shown in FIG. 2. The subsystem 300 includes conveyor devices 204A and 204B that move widgets through the assembly system; automated assembly machines 225A and 225B (e.g., assembly robots) that perform various functions on the widgets as they move through the assembly system (e.g., add components, remove temporary components, inspect the widgets or components of the widgets); and other process and control or data-capturing devices 310, such as devices that time-stamp widgets as they move into or exit from a region. The conveyor devices 204A and 204B, automated assembly machines 225A and 225B, and process control/data acquisition devices 310 are coupled to each other and to a central computer system 312 via a network 315.

In some implementations, the central computer system 312 may provide overall control of the assembly system 200 and of the assembly processes performed by each assembly station. In addition, the central computer system 312 may track which widgets (e.g., automobiles) are at which assembly stations, and various assembly options required by each widget-which may vary widget by widget. For example, referring to the region 203B shown in FIG. 3, widget 318A may require processing by each of the assembly stations 0027, 0028, 0029 and 0030, whereas, because of configuration options, widget 318B may only require processing by assembly stations 0028 and 0029. In the short term, the central computer system 312 may control individual assembly stations to implement such configuration options. For example, once the widget 318A enters the region 203B, as detected by the control device 310, the central computer system 312 may access a configuration file for that widget 318A, then download appropriate control information to various assembly machines or personnel instruction devices within the region. For longer term archiving purposes, the central computer system 312 may store certain data for each widget, including, in some implementations, a precise time at which particular widgets (e.g. widget 318A) enter or exit particular regions (e.g., region 203B). This archival data may be stored in a database system 322 that is coupled to the central computer system 312.

In some implementations, the database system 322 may include an interface that processes structured query language (SQL) statements to store, modify or retrieve data (referred to generally here as a "SQL database"). Data may be stored in such a SQL database in various tables. The database system may be part of an overall assembly tracking and control software package. One example of such a package is a CIMPLICITY Tracker™ system available from GE FANUC of Charlottesville, Va.

An automated assembly machine, such as the automated assembly machine 225B, may have a local control/data acquisition device 328 (e.g., a PLC (programmable logic controller)) through which the automated assembly machine 225B connects to the network 315. In addition, the automated assembly machine 225B may have a local terminal 325C from which an operator of a corresponding assembly station may monitor or locally override central control. Other terminals (e.g., terminals 325A and 325B) may be provided in central monitoring locations for use by supervisors or assembly plant managers to monitor or control various aspect of the assembly process. Certain data entered from the various terminals 325A, 325B or 325C, or data collected by data-capturing services such as device 310, may be stored by the central computer system 312 (e.g., in the database system 322).

Figure 4A:
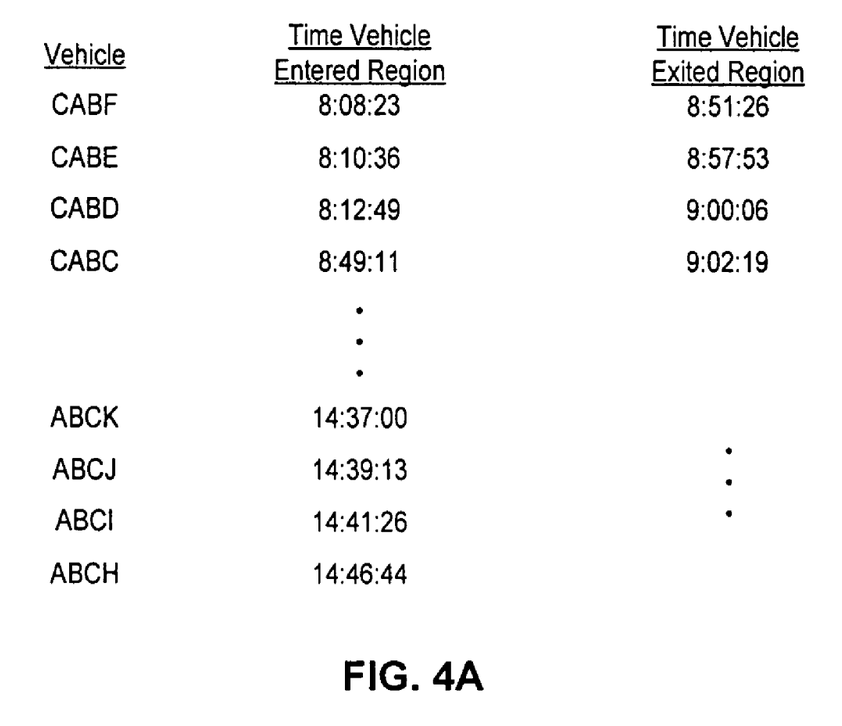
FIGS. 4A-4D illustrate example data that may be stored by a computer subsystem that may be included in an assembly system.
Figure 4B:
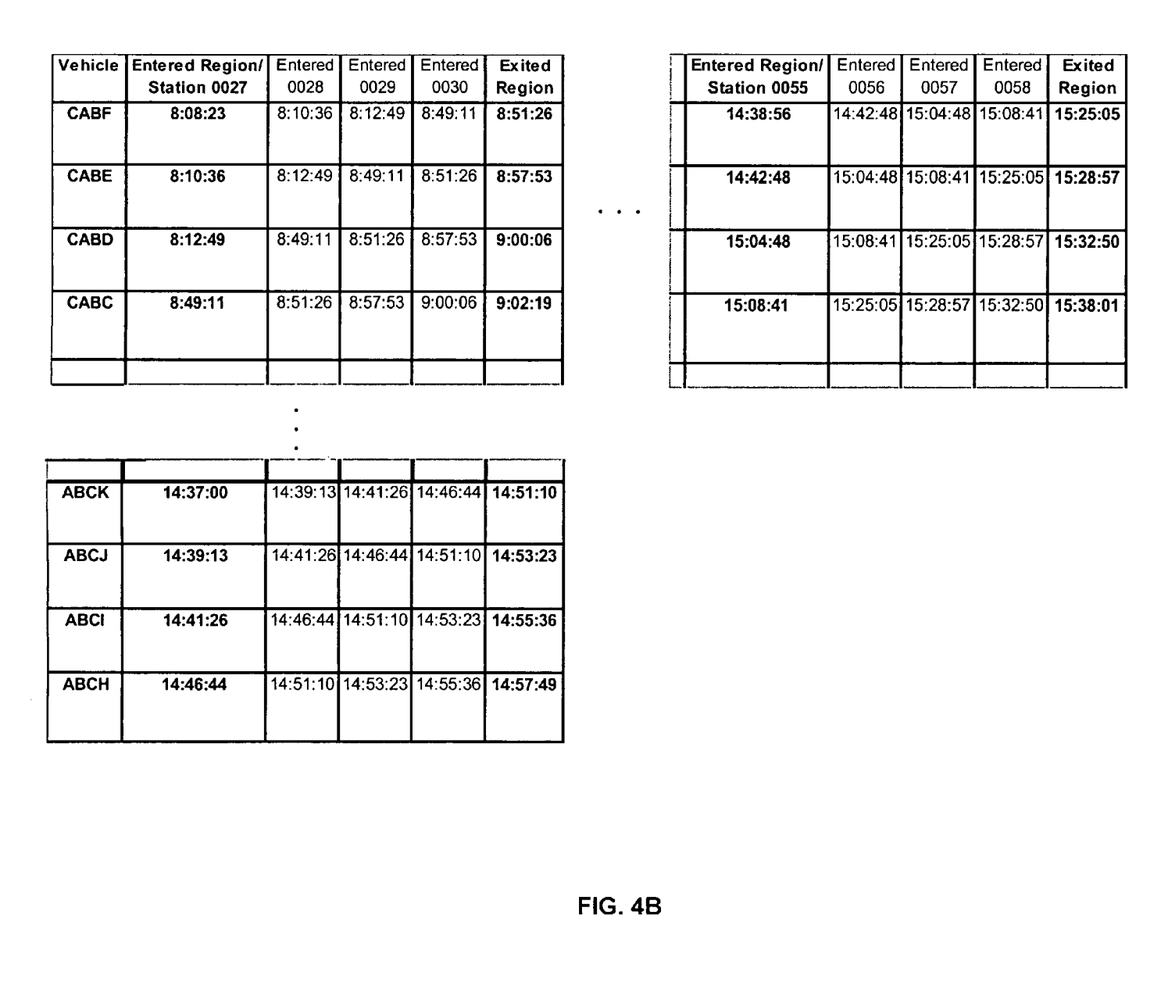

FIG. 4A illustrates example data that may be stored by the central computer system 312 for each widget. In particular, FIG. 4A illustrates example time-stamp data for specific automobiles shown in FIG. 2 that entered or exited region 203B. For example, as shown, the automobile CABE entered the region 203B (in particular, the first assembly station 0027 in the region 203B) at 8:10:36 and exited the region 203B (in particular the last assembly station 0030 in the region 203B) at 8:57:13. FIG. 4B illustrates intermediate processing times at assembly stations 0027, 0028, 0029 and 0030 within the region 203B. The data in FIG. 4B may not be stored, but rather may be determined according to, for example, the algorithms and processes that are described with reference to FIG. 5, below.

Figure 4C:
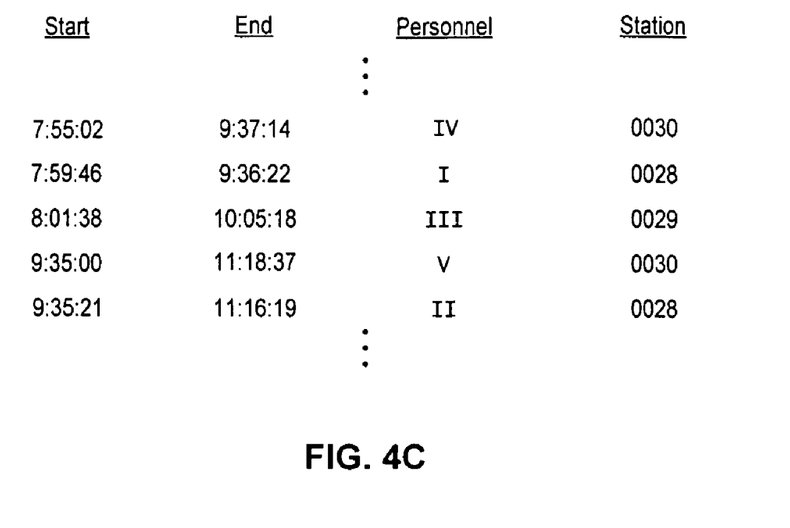

FIG. 4C illustrates example data that tracks assembly personnel who are assigned to specific assembly stations at specific times. In some implementations, this data may be stored in a human resources table, for example, that tracks time worked by various employees. This data may be used to correlate specific assembly employees with specific assembly stations at specific times. For example, given an assembly station (e.g., assembly station 0029) and a time (e.g., 8:49:11), a correlation may be made between the station and time and responsible employee (e.g., assembly employee III, who worked at station 0029 from 8:01:38 to 10:05:18-a time period that includes 8:49:11).

Figure 4D:
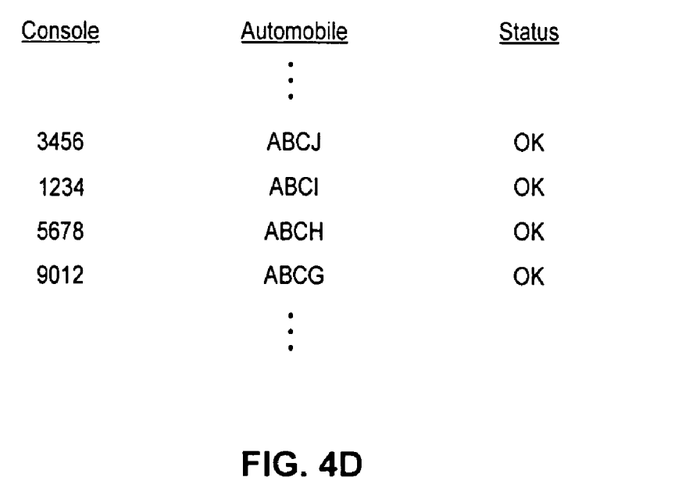

FIG. 4D illustrates example data that correlates specific widget components with specific widgets and provides status of an installation process of a specific widget component in a specific widget. For example, the data shows that console 3456 was installed in automobile ABCJ, and further shows that the initial installation status was "OK." It may be important to verify proper installation of certain components, such as components that directly affect the overall safety of the assembled vehicle. Moreover, in order to correct latent defects in particular components (e.g., components that also directly affect the overall safety of the assembled vehicle), it may be necessary to be able to later determine which components were installed in which widget. For example, in order to address a later-discovered defect in a particular lot of vehicle consoles, it may be necessary to be able to determine the vehicles in which the defective consoles were installed. Such determination may be possible from the data in the above-described tables and from the techniques described below.

Figure 5:
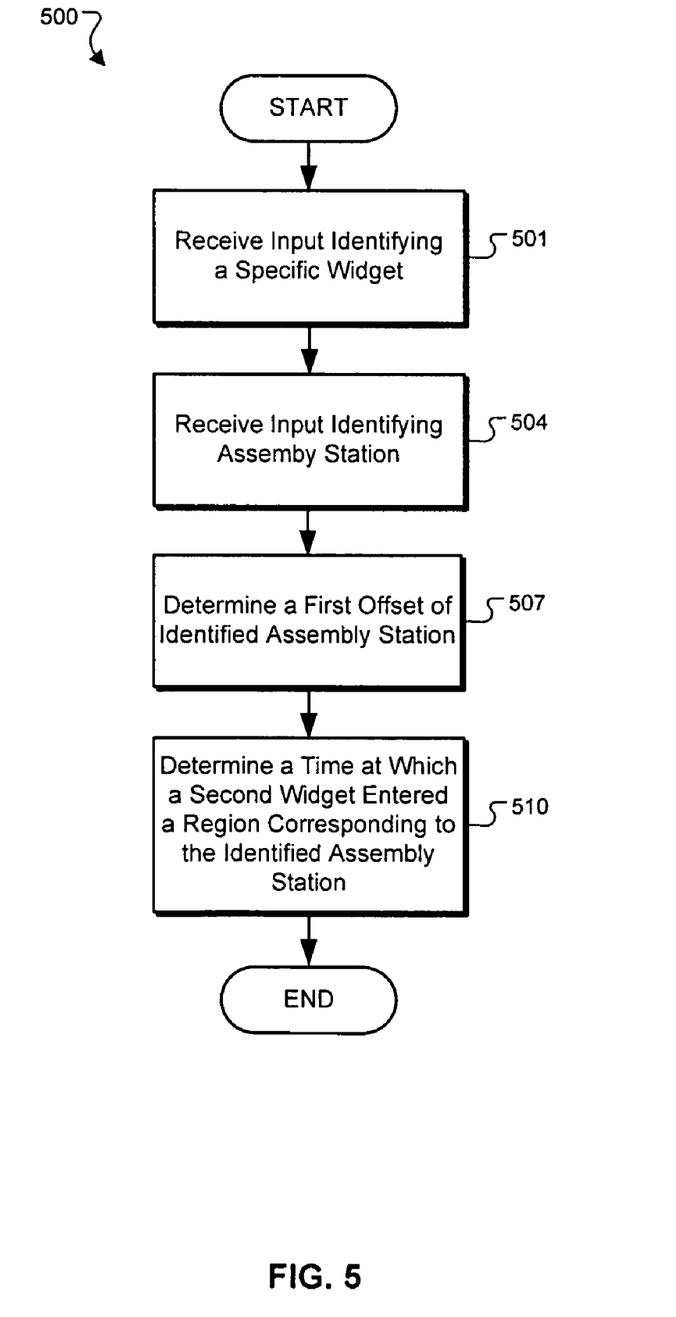
FIG. 5 is a flow diagram of an example process of determining an assembly time in an assembly system.

FIG. 5 is a flow diagram of an example process 500 that may be used to determine when a specific widget was processed by a specific assembly station within an assembly system. The process 500 may be implemented at least in part, by software running on a computer system within the assembly system, such as, for example, the central computer system 312 that is shown in FIG. 3.

The process 500 includes receiving (501) input identifying a specific widget. For example, with reference to FIGS. 2, 3 and 4A, software running on the central computer system 312 may receive input from a user of the terminal 325A identifying a specific widget, such as, for example, the automobile CABE. The process 500 includes receiving (504) additional input identifying one of the plurality of assembly stations. For example, the software running on the central computer system 312 may receive additional input from the user of the terminal 325A identifying the assembly station 0029.

The process 500 includes determining (507) a first offset of the identified assembly station relative to either a first assembly station or a last assembly station within a corresponding region. For example, the process 500 may determine (507) that the assembly station 0029 has an offset of three relative to the first assembly station 0027 in the corresponding region 203B. That is, assembly station 0029 is the third sequential assembly station in the region 203B.

The process 500 includes determining (510) a time at which a second sequentially processed widget entered or exited the region, where the identified specific widget and the second sequentially processed widget were separated in the assembly system by a number of widgets corresponding to the first offset. Determining (510) the time may include first identifying the second sequentially processed widget; in particular, determining (510) may include determining a value of the number of widgets corresponding to the first offset. In some implementations, this number is equal to the offset itself. In some implementations, the number is equal to the number of widgets between the first widget and the second sequentially processed widget—which may be the offset minus some fixed number, such as two (one for the first widget itself, one for the second sequentially processed widget). For example, the process 500 may identify the automobile CABC as being separated from the automobile CABE by a number of automobiles corresponding to the first offset (three, minus two, as described above). After identifying the second automobile (e.g., automobile CABC), the process may include actually determining (510) a time at which a second sequentially processed widget entered or exited the region. The process 500 may determine, for example, from the data shown in FIG. 4A, that automobile CABC entered the region 203B at 8:49:11. Because of the generally sequential processing of automobiles within the assembly system, the process 500 may accordingly determine that the identified automobile CABE entered the identified assembly station 0029 at 8:49:11.

In some cases, even though the widgets are generally processed sequentially, there may be circumstances in which widgets are physically removed midstream from the assembly system, or from a particular region in the assembly system. Any changes to the sequence of widgets in the assembly system may be logged, and the process 500 may include determining whether any such changes have been logged and adjusting accordingly. Two examples are provided with reference to the automobile assembly system 200.

In a first example, an automobile (e.g., CABC) may be physically removed from a station in the assembly system 200 (e.g., with a fork truck). However, the removed automobile may be associated with a corresponding "carrier" that remains in the region of the assembly system 200 from which the automobile was removed. The carrier itself may be tracked rather than a corresponding automobile, and the carrier may not be removed before reaching a subsequent buffer region, leaving a "gap" in the sequence of automobiles until that sequence reaches the buffer region. An appropriate database table may be modified to reflect that the carrier is no longer associated with a particular automobile (e.g., by setting an automobile identifier attribute of the carrier to null), but the carrier itself may still be tracked as it enters or exits the region. In a subsequent non-buffer region, after the carrier has been removed, the sequence of automobiles may be different than the sequence entering the region from which the automobile was removed, but this new sequence may be normally tracked in the subsequent region. Hence, in this first example, no adjustments may be necessary in order for the process 500 to determine when a specific widget was processed at a specific assembly station.

In a second example, an automobile (e.g., CABC) may be physically removed from a station in a particular region of the assembly system (e.g., again with a fork truck). In this second example, no carrier may remain in the region; moreover, the resulting "gap" may be closed. In particular, automobiles in the current region in front of the removed automobile may be held back, while automobiles in the current region that are behind the removed automobile may move forward until the gap is closed. (Note that this example is one in which an exception may apply to the process by which automobiles within a region generally pitch or move together.) To describe this example differently with reference to FIG. 2: automobiles CABF, CABE, CABD and CABC may progress into region 203C as shown; automobile CABC may be removed; and automobiles CABF, CABE and CABD may be held back while automobile CABB (not shown) is moved into the region 203C. In this example, automobiles CABF, CABE and CABD will have spent additional time at stations 0056, 0055 and 0054, respectively. To accurately account for this in determining, for example, a processing time for automobile CABE at station 0055, the process 500 may determine the time at which the automobile CABE enters station 0055 in the manner described above; but to determine the time at which the automobile exits station 0055, the process 500 may include increasing the offset by one (since one automobile was removed from the assembly system) and using the increased offset to identify another automobile entering the region. This change in offset may cause the process 500 to determine an exit time of the automobile CABE from the station 0055 based on an entrance time of an automobile CABA (not shown) to the region 203C, rather than based on an entrance time of the automobile CABB (also not shown).

To determine whether the above-described adjustment to the offset may be necessary, the process 500 may include running a query against data stored by the central computer system 312. In particular, when an automobile is removed from an assembly region and the corresponding gap is closed, the removal may be logged in a table in some manner (e.g., as an "Item Deleted" event). The process 500 may include querying any such table for changes to the sequence of automobiles between a specific automobile for which a processing time is to be determined and preceding or subsequent automobiles whose entrance or exit times to or from the region are to be used in the determination. If a change to the sequence is identified, an offset used in any time determination may be appropriately adjusted. In some similar scenarios, an automobile may be moved from one location in the assembly system to another, and this move may be tracked in a different manner than described above. For example, the move may be logged as a different kind of event (e.g., as an "Item Moved" event or "Exit Move" event). In such similar scenarios, the process 500 may include querying other appropriate table(s) to identify relevant changes to the sequence of automobiles.

Based on the determination (510) of a time at which a second sequentially processed widget entered or exited the region, additional correlations are possible. For example, referring back to the example above involving automobile CABE and assembly station 0029, additional data may be queried to determine specific personnel who were responsible for assembly operations at assembly station 0029 at 8:49:11. In particular, data in the table shown in FIG. 4C may be queried for this information (e.g., to determine that personnel III was assigned to station 0029 at this time). Or, additional data may be queried to determine specific components that were installed in specific time frames or on specific widgets.

Figure 6:
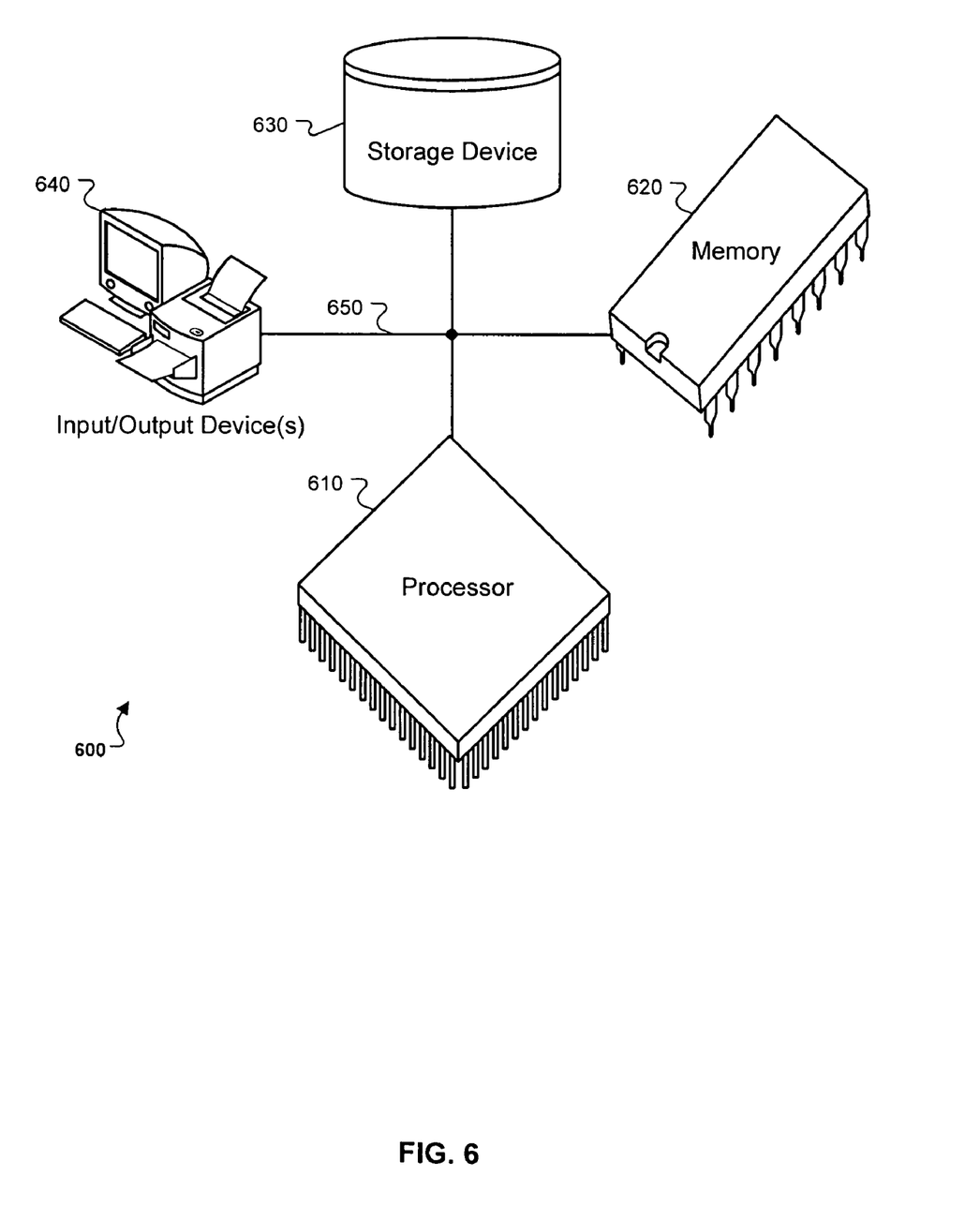
FIG. 6 is a schematic diagram of an example computing system.

FIG. 6 is a schematic diagram of an example computer device 600. The device 600 may be used in the process 500 described above. The computer device 600 may be included in any or all of the central computer system 312; the local control/data acquisition device 328; the terminals 325A, 325B or 325C; or in other devices in the control and data acquisition subsystem 300 or in the overall assembly system 200.

The device 600 includes a processor 610, a memory 620, a storage device 630, and an input/output device 640. Each of the components 610, 620, 630, and 640 are interconnected using a system bus 650. The processor 610 is capable of processing instructions for execution within the device 600. In some implementations, the processor 610 is a single-threaded processor. In other implementations, the processor 610 is a multi-threaded processor. The processor 610 may also be capable of processing instructions stored in the memory 620 or on the storage device 630 to display graphical information for a user interface on the input/output device 640.

The memory 620 stores information within the device 600. In some implementations, the memory 620 is a computer-readable medium. In some implementations, the memory 620 is a volatile memory unit. In other implementations, the memory 620 is a non-volatile memory unit.

The storage device 630 is capable of providing mass storage for the device 600. In some implementations, the storage device 630 is a computer-readable medium. In various different implementations, the storage device 630 may be a floppy disk device, a hard disk device, an optical disk device, or a tape device.

The input/output device 640 provides input/output operations for the system 600. In some implementations, the input/output device 640 includes a keyboard and/or pointing device. In other implementations, the input/output device 640 includes a display unit for displaying graphical user interfaces.

The features described can be implemented in digital electronic circuitry, or in computer hardware, firmware, software, or in combinations of them. Apparatus can be implemented in a computer program product tangibly embodied in an information carrier, e.g., in a machine-readable storage device or in a propagated signal, for execution by a programmable processor; and process steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard or keypad and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. The logic flows depicted in the figures do not require the particular order shown, or sequential order, to achieve desirable results. Also, other steps may be provided, or steps may be eliminated, from the described flows, and other components may be added to, or removed from, the described systems. Accordingly, other implementations are within the scope of the following claims:

What is claimed is:

1. A method of determining when a specific article of manufacture was processed by a specific assembly station, the method comprising:

receiving input in an assembly system that assembles articles of manufacture at a plurality of assembly regions and logs a time at which each article of manufacture enters or exits an assembly region, each assembly region comprising a plurality of sequential assembly stations, each assembly station being configured to process an article of manufacture, the received input identifying a specific article of manufacture;

receiving additional input identifying one of the plurality of sequential assembly stations;

determining an offset of the identified sequential assembly station relative to a first assembly station or to a last assembly station within a region that comprises the identified sequential assembly station; and determining a time at which a second sequentially processed article of manufacture entered or exited the region, wherein the identified specific article of manufacture and the second sequentially processed article of manufacture were separated in the assembly system by a number of articles of manufacture that corresponds to the offset.

2. The method of claim 1, wherein the number of articles of manufacture that corresponds to the offset is equal to the offset adjusted by a fixed number.

3. The method of claim 1, wherein processing the article of manufacture comprises adding a component to the article of manufacture.

4. The method of claim 1, wherein logging the time at which each article of manufacture enters or exits an assembly region comprises logging the time in a database.

5. The method of claim 4, wherein the database is included in a automobile assembly tracking system.

6. The method of claim 4, wherein determining the time at which the second sequentially processed article of manufacture entered or exited the region comprises retrieving a logged time entry from the database.

7. The method of claim 6, wherein retrieving the logged time entry comprises executing a structured query language (SQL) statement to retrieve the logged entry.

8. The method of claim 1, wherein logging the time comprises logging the time at which each article of manufacture enters an assembly region.

9. The method of claim 1, further comprising determining a second time at which a third sequentially processed article of manufacture entered or exited the region, wherein the third sequentially processed article of manufacture was processed adjacent to the second sequentially processed article of manufacture.

10. The method of claim 9, further comprising determining a duration of time for which the identified specific article of manufacture was processed at the identified assembly station based on a difference between the determined time and the determined second time.

11. The method of claim 1, further comprising correlating another assembly parameter with the identified specific article of manufacture and the identified sequential assembly station.

12. The method of claim 11, wherein correlating another assembly parameter with the identified specific article of manufacture comprises correlating one or more specific assembly personnel with the identified specific article of manufacture and the identified sequential assembly station based on the determined time.

13. The method of claim 12, wherein correlating one or more specific assembly personnel comprises identifying one or more specific assembly personnel assigned to the identified sequential assembly station at the determined time.

14. The method of claim 1, wherein determining the time at which the second sequentially processed article of manufacture entered or exited the region comprises determining whether another article of manufacture has been physically removed midstream from the assembly system.

15. The method of claim 14, further comprising adjusting the offset when another article of manufacture has been physically removed midstream from the assembly system.

16. A computer program product tangibly embodied in a machine-readable storage device, the computer program product comprising instructions that, when executed, cause a data processing apparatus to perform operations comprising:

receiving input in an assembly system that assembles products in a plurality of assembly regions and logs a time at which each product enters or exits an assembly region, each assembly region comprising a plurality of sequential assembly stations, each assembly station being configured to process a product, the received input identifying a specific product;

receiving additional input identifying one of the plurality of sequential assembly stations;

determining an offset of the identified sequential assembly station relative to a first assembly station or to a last assembly station within a region that comprises the identified sequential assembly station; and determining a time at which a second sequentially processed product entered or exited the region, wherein the identified specific product and the second sequentially processed product were separated in the assembly system by a number of products that corresponds to the offset.

17. The computer program product of claim 16, wherein the operations further comprise determining a second time at which a third sequentially processed product entered or exited the region, wherein the third sequentially processed product was processed immediately adjacent to the second sequentially processed product.

18. The computer program product of claim 17, wherein the operations further comprise determining a time at which the identified specific product was processed by the identified assembly station based on a difference between the determined time and the determined second time.

19. The computer program product of claim 16, wherein the operations further comprise correlating another assembly parameter with the identified specific product and the identified sequential assembly station.

20. A method of determining when a specific automobile was processed by a specific assembly station, the method comprising:

receiving input in an automobile assembly system that assembles automobiles at a plurality of assembly regions and logs a time at which each automobile enters or exits an assembly region in an assembly database, each assembly region comprising a plurality of sequential assembly stations, each assembly station being configured to process automobiles, the received input identifying a specific automobile;

receiving additional input identifying one of the plurality of sequential assembly stations;

determining an offset of the identified sequential assembly station relative to a first assembly station or to a last assembly station within a region that comprises the identified sequential assembly station; and determining a time at which a second sequentially processed automobile entered or exited the region, wherein the identified specific automobile and the second sequentially processed automobile were separated in the assembly system by a number of automobiles that corresponds to the offset.

* * * * *